United States Patent [19]

Gallacher et al.

[11] 4,255,395

[45] * Mar. 10, 1981

[54] SOLVENT-EXTRACTION PROCESS FOR RECOVERY AND SEPARATION OF METAL VALUES

[75] Inventors: Lawrence V. Gallacher, East Norwalk; Rachelle M. Rydzik, Easton, both of Conn.

[73] Assignee: King Industries, Inc., Norwalk, Conn.

[*] Notice: The portion of the term of this patent subsequent to Sep. 4, 1996, has been disclaimed.

[21] Appl. No.: 70,922

[22] Filed: Aug. 30, 1979

Related U.S. Application Data

[63] Continuation-in-part of Ser. No. 892,327, Mar. 31, 1978, Pat. No. 4,166,837.

[51] Int. Cl.$^3$ .................. C01G 49/00; C01G 51/00; C01G 53/00; C01G 3/00
[52] U.S. Cl. .................. 423/24; 423/100; 423/139
[58] Field of Search .................. 548/101, 108, 257; 252/50; 423/24, 100, 139, DIG. 14

[56] References Cited

U.S. PATENT DOCUMENTS

| | | | |
|---|---|---|---|
| 2,296,306 | 9/1942 | Peterson | 548/108 |
| 3,352,824 | 11/1967 | Mauz | 548/108 |
| 3,699,114 | 10/1972 | Ohkubo | 548/108 |
| 4,060,491 | 11/1977 | Bridger | 252/50 |
| 4,166,837 | 9/1979 | Gallacher | 423/24 |

OTHER PUBLICATIONS

Morrison et al *Solvent Extraction in Analytical Chemistry*, John Wiley and Sons, Inc., N.Y. (1957) pp. 56, 57, 110.
Habashi, F., *Principles of Extractive Metallurgy*, vol. 2, Gordon and Breach, N.Y. (1970) pp. 369, 385.
*Referativnyi Zhurnal Khimiya*, 1976, Abstract No. 14g7.
Curtis "Quantitative Determination and Separation of Copper with Benzotriazole" *Industrial and Engineering Chemistry*, Analytical Edition (1941) pp. 349–351.

*Primary Examiner*—Brian E. Hearn
*Attorney, Agent, or Firm*—Morgan, Finnegan, Pine, Foley & Lee

[57] ABSTRACT

Improved solvent-extractants for the selective recovery of metal values from acidic aqueous media comprise solutions of 5-alkylbenzotriazoles in water-immiscible organic solvents. Extraction efficiency is enhanced by addition to the solvent-extractant of alkyl aromatic sulfonic acids, alkyl phosphoric acids or carboxylic acids. Especially important applications for the improved solvent-extractants are in the recovery of copper (II) from cobalt (II), copper (II) from nickel (II), copper (II) from iron (III), copper (II) from zinc (II), nickel (II) from cobalt (II), nickel (II) from zinc (II), nickel (II) from iron (III), iron (III) from magnesium (II), and cobalt (II) from zinc (II).

16 Claims, No Drawings

SOLVENT-EXTRACTION PROCESS FOR RECOVERY AND SEPARATION OF METAL VALUES

CROSS REFERENCE TO RELATED APPLICATION

This application is a continuation-in-part of copending U.S. patent application Ser. No. 892,327, filed Mar. 31, 1978, now U.S. Pat. No. 4,166,837.

This invention relates to a solvent-extractant method for recovering metal values from aqueous media.

BACKGROUND OF THE INVENTION

Gallacher, U.S. Pat. No. 4,018,865 and copending U.S. patent application Ser. No. 785,069, filed Apr. 7, 1977, now allowed, describes the use of water-immiscible organic solvent solutions of alkyl aromatic sulfonic acids alone or in combination with an α-hydroxy oxime for the separation of difficult to separate metal value pairs in acidic aqueous media.

In Gallacher and Rydzik copending U.S. patent application Ser. No. 892,327, filed Mar. 31, 1978, now allowed, it is disclosed that the selective extraction efficiency of the foregoing solvent-extractants can be improved by the addition of a fuzed ring aromatic N-alkyl triazole.

Fuzed ring aromatic triazoles, alkylated on the aromatic ring with, e.g., $C_4$–$C_{16}$ alkyl groups, are known from Netherlands Pat. Publication No. 6,414,144; U.K. Pat. No. 1,065,995 and Bridger et al., U.S. Pat. No. 4,060,491. Claim 1 of U.K. Pat. No. 1,065,995 shows substituted 1-H benzotriazoles having the formula:

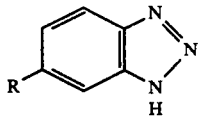

wherein R is a straight- or branched-chain alkyl group containing from two to twenty carbon atoms. In U.S. Pat. No. 4,060,491, 5-alkylbenzotriazoles, wherein the alkyl group contains from 4 to 16 carbon atoms, are disclosed to be useful anti-wear additives for lubricants. The foregoing applications, publications and patents are incorporated herein by reference.

It has now been discovered that 5-alkyl benzotriazoles are excellent in their own right as solvent-extractants for selectively separating metal values. Moreover, the selective extraction efficiency of such 5-alkyl benzotriazoles can be improved by the addition of acidic compounds, such as alkyl aromatic sulfonic acids, dialkyl phosphoric acids and/or carboxylic acids. In addition, such solvent-extractants are uniquely adaptable for use in processes wherein the kinetics of separation and stripping are enhanced with additives such as 1-alkylbenzotriazole, and/or by using higher than the usual temperatures for extraction and stripping. These advantages will become apparent from the Examples hereinafter set forth.

SUMMARY OF THE INVENTION

According to the present invention there is provided a process for recovering a first cationic metal value from an aqueous solution comprising a pair of said first cationic metal value and a second cationic metal value, said process comprising contacting said aqueous solution at an acid pH, e.g., of below 6.0, with a solvent-extractant comprising:

(i) a 5-alkylbenzotriazole, the alkyl groups of which contain from about 4 to about 18 carbon atoms; and (ii) a water-immiscible solvent for (i) and metal complexes thereof to provide a solution of said metal value in said solvent-extractant;

separating the solution thus formed from the aqueous raffinate depleted in said first metal value; and recovering said first metal value from said separated solution.

In preferred embodiments, the metal pairs comprise copper (II) and cobalt (II), copper (II) and nickel (II), copper (II) and iron (III), copper (II) and zinc (II) and cobalt (II) and zinc (II); and the 5-alkylbenzotriazole (i) is 5-dodecylbenzotriazole;

In another preferred feature, the invention contemplates a process as above-defined wherein the solvent-extractant also includes (iii)(a) an alkyl aromatic sulfonic acid; (b) a dialkyl phosphoric acid; (c) a carboxylic acid, or a mixture of any of the foregoing, the mole % of 5-alkylbenzotriazole (i) in the combined (i) and (iii) being in the range of 10 to 95.

In preferred sub-features of this embodiment, the metal pairs comprise copper (II) and cobalt (II), copper (II) and nickel (II), copper (II) and iron (III), copper (II) and zinc (II), nickel (II) and cobalt (II), nickel (II) and zinc (II), nickel (II) and iron (III), iron (III) and magnesium (II) and cobalt (II) and zinc (II); the solvent extractant also includes a 1-alkylbenzotriazole; the alkyl groups of which contain from 4 to 18 carbon atoms; the alkyl aromatic sulfonic acid (iii)(a) is a polyalkyl aromatic sulfonic acid having a molecular weight of at least about 400; and preferably is dinonylnaphthalene sulfonic acid; or is didodecylnaphthalene sulfonic acid; or is di-(2-ethylhexyl) phosphoric acid; or is a carboxylic acid (iii)(c) having a molecular weight in the range of 125–300.

In all cases, preferred features also include a step wherein said first metal value is recovered from said separated solution by stripping with acid; preferably a step wherein the stripping with acid is carried out at an elevated temperature of from about 30° to about 70° C.

Many of the modern mining and metallurgical procedures can be carried out to produce suitable aqueous metal feed solutions for the present process. Merely by way of illustration, the process of the present invention has specific application to the separation of copper values from an aqueous solution of copper and iron values. The process can be used to obtain a first solvent fraction concentrated in copper, and an aqueous raffinate fraction concentrated in iron. Further, the process also has specific and advantageous application to the separation of other difficult to separate metals in aqueous solutions. These additional mixtures comprise the pairs of metals set forth above.

As has been mentioned, the 5-alkylbenzotriazoles used in the present invention are known in the art, and they can be prepared by methods set forth in the cited references. The alkyl group can contain from 4 to 18 carbon atoms, straight chain or branched, e.g., n-butyl, t-butyl, n-octyl, 2-ethylhexyl, n-decyl, dodecyl, hexadecyl, and the like. The compound 5-dodecyl benzotriazole is preferred. This can be prepared by converting 4-dodecylaniline (I) to 4-dodecylacetanilide (II) with acetic anhydride to prevent oxidation of the amino group during nitration. II is nitrated in acetic anhydride solution at room temperature using 70% nitric acid to form 4-dodecyl-2-nitroacetanilide (III). THe protective acetanilide group is removed by NaOH hydrolysis of III in aqueous isobutyl alcohol to produce 4-dodecyl-2-nitroaniline (IV). Reduction of the nitro group is accomplished by reacting IV with iron and hydrochloric acid in isopropyl alcohol to give 5-dodecyl-o-phenylenediamine (V). This is converted to 5-dodecylbenzotriazole by reaction with sodium nitrite in acetic acid solution. Analogous procedures are used to prepare the other counterparts. The 5-alkylbenzotriazole can also be substituted with $C_1$–$C_9$ alkyl groups in the 1-position; and they may also contain minor amounts of 4-, and 6-alkyl-substituted analogs.

In those embodiments employing an acid additive (iii)(a), (iii)(b), and/or (iii)(c), the alkyl aromatic sulfonic acids (iii)(a) preferably will have a molecular weight of at least about 400. They can vary widely in chemical nature, so long as they have a minimum molecular weight of about 400 and at least one, and preferably two, alkyl groups on the aromatic sulfonic acid nucleus. If a phenyl nucleus is present, these requirements can be met with a benzene sulfonic acid containing one alkyl group containing at least 18 carbon atoms; e.g., octadecylbenzenesulfonic acid, two alkyl groups having a total of at least 18 carbon atoms, e.g., dinonylbenzenesulfonic acid, or three or four alkyl groups having a total of at least 18 carbon atoms, e.g., tetrapentylbenzenesulfonic acid. Alkylaromatic polysulfonic acids should also have a ratio of molecular weight to sulfonic acid groups of at least 400:1. Instead of a phenyl nucleus, the aromatic nucleus can be polycyclic, e.g., naphthalene, anthracene, phenanthrene, tetrahydronaphthalene, etc. Many variations in the position of substitution are possible and contemplated and mixed positional isomers are included. The alkyl substituents can be straight or branched chain. Additional groups such as hydroxy, ether, halogens, etc., can also be present. Best results are obtained with maximum variations in substituent locations and with maximum branching.

The most preferred alkylaromatic sulfonic acids are branched polyalkyl substituted naphthalene sulfonic acids. These are available, for example, by sulfonating polyalkylnaphthalenes. The polyalkylnaphthalenes can be made by alkylating naphthalene with olefins, for example, propylene trimer or tetramer, or alkyl halides, with a suitable catalyst, e.g., hydrogen fluoride or anhydrous aluminum chloride in a suitable solvent such as naphtha, sulfur dioxide, nitrobenzene or a mixture of benzene and nitrobenzene. See Robert G. King and George W. Thielcke, U.S. Pat. No. 2,764,548, assigned to the assignee of the present invention. Such a process produces naphthalene substituted with alkyl groups and, if a branched olefin is used, such as propylene trimer or propylene tetramer,—obtained by polymerizing propylene by an acid catalyst such as phosphoric acid, then the alkyl groups will be highly branched as well. Sulfonation is obtained by treating the polyalkylaromatic with a sulfonating agent. For example, the dialkyl aromatic compound is dissolved in an inert solvent, such as petroleum naphtha, hexane, heptane, octane, chlorinated solvents, and the like, and sulfuric acid, preferably oleum, is introduced into the solution at the desired temperature and with agitation. After reaction is complete, the sulfonic acid—and also some polysulfonic acid—is recovered by adding water to selectively extract any polysulfonic acid, leaving the alkylaromatic sulfonic acid in the organic phase. Detailed techniques for preparing dinonylnaphthalene sulfonic acid, didodecylnaphthalene sulfonic acid and isomers and analogs thereof, including the benzene analogs, is described in the King et al patent, U.S. Pat. No. 3,764,548, incorporated herein by reference.

Any of the conventional dialkyl phosphoric acids (iii)(b) can be used, such as $C_6$–$C_{30}$ dialkyl phosphoric acids. The preferable compound in this family is di(2-ethylhexyl) phosphoric acid.

Carboxylic acids (iii)(c) useful in the present process also can vary widely in chemical nature. They will contain carbon, hydrogen and oxygen. Such products are commercially available, e.g., VERSATIC 10, Shell Chemical Co., or Naphthenic Acid, Exxon Co. VERSATIC 10 is a mixture of highly branched isomers $C_{10}$ monocarboxylic acids, mainly tertiary, with a molecular weight of 156. The carboxylic acids can have a molecular weight falling in the range from about 125 to 400, or so, but preferably in the range of from about 125 to about 300.

The N-substituted benzotriazoles used in certain preferred embodiments can be made by procedures well known to those skilled in the art. For example, an unsubstituted benzotriazole can be alkylated with nonene, decene or other appropriate olefin in the presence of an acid-treated clay catalyst at a conventional temperature, e.g., 140° C.

The solvent-extractant, as contemplated above, includes (i) a 5-alkylbenzotriazole, (ii) a water-immiscible organic solvent, and, optionally, (iii) an acid. A wide variety of water-immiscible organic solvents (diluents), in which the extraction reagents (i) and (iii) are dissolved, can be employed according to this invention. The minimum requirements for diluent (ii), however, are that the diluent be substantially water-immiscible, that it will dissolve the reagents and metal complexes thereof, and that it will not interfere with the function of the reagent in extracting the metal values from acid solutions. These diluents can be aliphatic or aromatic hydrocarbons, halogenated hydrocarbons, petroleum derivatives, ethers, etc. Examples of these various diluents are toluene, carbon tetrachloride, benzene, xylene, fuel oil, chloroform, 2-ethylhexanol, kerosene, and, particularly, normal aliphatic hydrocarbons of 10 to 13 carbon atoms (Norpar-12, Exxon Co.).

Generally, the 5-alkylbenzotriazole extractant will be present in the organic phase in an amount sufficient to extract at least a portion of the first metal values, e.g., copper, from the aqueous solution. Preferably the 5-alkylbenzotriazole will be present in an amount of from about 2 to about 50% by weight based on the total organic phase with an amount of from 5 to 20% by weight being particularly preferred.

Although the volumetric phase ratios of the organic extractant to the aqueous solution can vary depending upon several factors, including the amount of first metal present in the aqueous phase and the concentrations of 5-alkylbenzotriazole (i) and optional acid (iii) in the organic phase, generally, volumetric phase ratios of from about 1:3 to about 3:1 will be used. These ratios will extract essentially all of the first metal from the aqueous solution within a small number of extraction stages, e.g., 5 or less. In continuous column extractors of similar equipment, 5 or fewer contacts or theoretical plates will normally suffice. Under most circumstances, an extraction or contacting period per stage of at most five minutes is significant, although the extraction time usually may be reduced to 1 to 2 minutes, and often 30 seconds or less.

The solvent-extractant reagent may be contacted with the metal containing aqueous feed by any of the well-known procedures employed in solvent-extraction. While continuous countercurrent methods are preferred, batch, continuous batch, and batch countercurrent methods may also be used. The liquid-liquid contacting means may comprise a pulse column, a counter-current rotating disc column, and other known systems. Mixing may be carried out at conventional temperatures, advantageously in the range of about 10° C. to 70° C.

After the first metal values have been transferred to the organic phase and the aqueous and organic phases separated, the organic phase containing the first metal value is stripped in any suitable liquid-liquid contactor. In the stripping operation, the first metal containing organic phase is contacted with 10 to 150% by volume of a mineral acid, e.g., sulfuric, nitric or hydrochloric, the choice of acid depending on the anion of the metal required.

For convenience, the extraction, separation of phases and stripping operations may be carried out on a test basis in separatory funnels. These correlate well with commercial size operations. Equipment useful in commercial practice is well known and is described in Mining Engineering, 17, pp. 76–80, December, 1965. The determination of maximum loading capacity of the organic solutions for metals, equilibrium isotherms for extraction and stripping, and use of the equilibrium isotherms for determining the number of extraction stages required for substantially complete removal of the metal are set forth in the article, which is incorporated herein by reference.

In a commercial operation, the aqueous feed and the extractant solutions are fed in the desired ratio into a small agitated mixer. After mixing for one to two minutes, or less, the mixture overflows to a settler for a period of about five minutes, residence. The phases are then separated continuously, the aqueous raffinate being drawn off and the organic layer transferred to an agitated stripper vessel where acid is added and mixed for about one to two minutes or less. The mixture is then transferred to a settler where, after a few minutes, the phases are separated.

DESCRIPTION OF THE PREFERRED EMBODIMENTS

The following examples illustrate the process of the present invention, but are not intended to limit it in any manner whatsoever. In addition, certain comparative procedures are set forth to show the advantages in proceeding according to the present invention.

When used herein, the separation factor $S_{A/B}$ is calculated from the expression:

$$S_{A/B} = \frac{(\% \text{ A extracted}) (100 - \% \text{ B extracted})}{(\% \text{ B extracted}) (100 - \% \text{ A extracted})}$$

EXAMPLES 1–5

Aqueous feed solutions comprising copper (II), cobalt (II), nickel (II), iron (II), iron (III) and zinc (II) are prepared and pH-adjusted using dilute sulfonic acid. A solvent-extractant solution comprising 12.3 wt.% of 5-dodecylbenzotriazole in Norpar-12 (a mixture of $C_{10}$–$C_{13}$ normal paraffins, Exxon Company, U.S.A.) is prepared, equivalent to 0.325 molar 5-dodecylbenzotriazole. The extractions are carried out in a 50 ml. graduate by mixing 25 ml. portions of the solvent-extractant with 25 ml. portions of the respective aqueous feeds for 1 minute at room temperature (23° C.) and allowing the layers to separate. A portion of the aqueous raffinate is then diluted with deionized water and then analyzed for the respective metal values with atomic absorption. The percentages of metals extracted and the separation factors are then determined, with the results set forth in Table 1:

TABLE 1

Selective Extraction of First Metal ($M_1$) from Second Metal ($M_2$) with 5-Dodecylbenzotriazole

| Example | $M_1$ | $M_2$ | pH | Feed Conc., g/l. $M_1$ | $M_2$ | % Extracted $M_1$ | $M_2$ | S* $M_1/M_2$ |
|---|---|---|---|---|---|---|---|---|
| 1 | Cu | Co | 2.21 | 2.0 | 2.0 | 69.8 | 1.0 | 228.3 |
| 2 | Cu | Ni | 1.79 | 2.0 | 2.0 | 61.0 | 2.0 | 76.6 |
| 3 | Cu | Fe | 1.28 | 2.0 | $2.0^{+3}$ $0.4^{+2}$ | 29.3 | 5.2 | 7.5 |
| 4 | Cu | Zn | 1.88 | 2.0 | 2.0 | 17.75 | 0 | 107** |
| 5 | Co | Zn | 1.78 | 2.0 | 1.0 | 2.5 | 0 | 12.8** |

*Separation factor, $S_{A/B} = D_A D_B$.
**Taking $M_2$% extracted as 0.2.

The results shown in this table indicate that 5-dodecylbenzotriazole by itself is a very selective extractant for copper and other metals in the presence of contaminating metals.

EXAMPLES 6–16

Metal values are dissolved in aqueous acidic solutions as generally described in Example 1. Solvent-extractant solutions comprising 5-dodecylbenzotriazole (5-DBT) and didodecylnaphthalene sulfonic acid (DDNSA) are prepared by mixing stock solutions comprising, respectively, 12.3 wt.% of 5-DBT in Norpar-12 and 11.8 wt.% of DDNSA in Norpar-12. The two stock solutions are mixed in the following ratios:

| Extractant | Relative Wt. 12.3% 5-DBT | Relative Wt. 11.8% DDNSA | Total Moles/liter | Molarity 5-DBT | DDNSA | 5-DBT:DDNSA Mole Ratio |
|---|---|---|---|---|---|---|
| A | 7.68 | 0 | .326 | .326 | 0.0 | ∞ |
| B | 7.68 | 2.14 | .291 | .255 | .036 | 7.08 |
| C | 7.68 | 2.99 | .281 | .235 | .046 | 5.11 |
| D | 7.68 | 4.97 | .264 | .199 | .065 | 3.06 |
| E | 7.68 | 7.50 | .255 | .171 | .084 | 2.02 |
| F | 3.84 | 7.495 | .221 | .111 | .110 | 1.01 |
| G | 0 | 7.68 | .113 | 0.0 | .113 | 0.0 |

25 ml. of each extractant solution is equilibrated with 25 ml. of each feed solution for 1 minute at room temperature. As noted for Example 1, all of the metal pairs and the pH-adjusting acid are based on sulfate. All of the metal ions are present at 2 g./l., except iron, where solutions are used containing 2.0 g./l. of iron (III) and 0.4 g./l. of iron (II). The results are presented in Tables 2A and 2B:

TABLE 2

A: Selective Extraction with 5-DBT/DDNSA Mixtures*

| Example | Extractant | Mole Ratio 5-DBT/DDNSA | Cu % Extracted | Fe % Extracted | S Cu/Fe |
|---|---|---|---|---|---|
| 3 | A | ∞ | 29.3 | 5.2 | 7.5 |
| 6 | B | 7.08 | 76.0 | 0.2 | 1580 |
| 7 | C | 5.11 | 85.0 | 0.2 | 2828 |
| 8 | D | 3.06 | 83.5 | 0.6 | 838 |

TABLE 2-continued

| | | | | | |
|---|---|---|---|---|---|
| 9 | F | 1.01 | 80.5 | 5.2 | 75.3 |
| 10 | G | 0.00 | 51.5 | 53.3 | 0.9 |

*Feed - pH 1.28

B: Selective Extraction with 5-DBT/DDNSA Mixtures

| Example | Extractant | Mole Ratio 5-DBT/ DDNSA | Ni % Extracted | Co % Extracted | S Ni/Co |
|---|---|---|---|---|---|
| 11 | A | ∞ | 1.0 | 0.8 | 1.3 |
| 12 | B | 7.08 | 22.5 | 0.5 | 57.8 |
| 13 | C | 5.11 | 33.0 | 1.3 | 38.9 |
| 14 | D | 3.06 | 44.3 | 3.5 | 21.9 |
| 15 | F | 1.01 | 32.0 | 14.5 | 2.8 |
| 16 | G | 0.00 | 58.0 | 60.0 | 0.9 |

*Feed - pH 1.5

It can be seen in Table 2A that reagent mixtures of 5-DBT and DDNSA are extremely specific for copper in the presence of iron, giving very high extraction of copper and negligible extraction of iron, even at a mole ratio of 1:1 and a pH of 1.28. The selectivity of nickel versus cobalt (Table 2B) is also excellent but not as high as that for copper versus iron. Here there is a definite enhancement resulting from the presence of the alkylaromatic sulfonic acid as can be seen from the difference between Examples 3 and 6 (Table 2A).

EXAMPLES 17-25

The procedure of Examples 6-16 is repeated with other pairs of metal values using a mole ratio of 5-DBT:DDNSA of 3.06:1 (Extractant D) and, in one instance, a mole ratio of 2.02:1 (Extractant E). The results are set forth in Table 3:

TABLE 3

Selective Extraction of Metal Pairs ($M_1/M_2$) with 5-DBT/DDNSA Mixtures

| Example* | $M_1$ | $M_2$ | $M_1$,g/l | $M_2$,g/l | pH | % Extracted $M_1$ | % Extracted $M_2$ | Separation Factor |
|---|---|---|---|---|---|---|---|---|
| 17 | Cu | Co | 2.0 | 2.0 | 2.21 | 93.8 | 1.8 | 842.1 |
| 18 | Cu | Ni | 2.0 | 2.0 | 1.79 | 69.8 | 6.5 | 33.2 |
| 19 | Cu | Fe | 2.0 | 2.0** | 1.28 | 83.5 | 0.6 | 838.4 |
| 20 | Cu | Zn | 2.0 | 2.0 | 1.88 | 49.3 | 5.0 | 18.4 |
| 21 | Co | Zn | 2.0 | 2.0 | 1.78 | 11.0 | 4.0 | 2.97 |
| 22 | Ni | Co | 2.0 | 2.0 | 1.5 | 44.3 | 3.5 | 21.9 |
| 23 | Ni | Zn | 2.0 | 2.0 | 1.5 | 35.8 | 3.0 | 18.0 |
| 24 | Ni | Fe | 2.0 | 2.0** | 1.0 | 18.0 | 0.6 | 36.4 |
| 25 | Fe | Mg | 2.0** | 2.0 | 2.48 | 21.5 | 1.0 | 27.1 |

*Mole ratio 5-DBT:DDNSA Ex 17-24, incl.; 3.06:1; Ex. 25; 2.02:1
**Iron (III), 2.0 g./l.; iron (II), 0.4 g./l.

In every case, when extracting feed solutions containing copper and another metal ion, the copper is always preferentially extracted. However, while copper is favored in the presence of nickel, nickel is favored when cobalt and/or other metal ions are present. Similarly, iron is rejected in the presence of either copper or nickel, but when iron/magnesium mixtures are extracted, iron is preferentially extracted over magnesium. This suggests an extremely high rejection for magnesium and zinc in this system.

EXAMPLES 26-27

An extractant comprising a mixture of 5-dodecylbenzotriazole and DDNSA or dinonylnaphthalene sulfonic acid (DNNSA) at a mole ratio of 2.02:1 is prepared by the general procedure of Example 6, Extractant E. Feed solutions comprising nickel (II) and cobalt (II) at 2 g./l. and copper (II) and iron (II) and (III) at 4.0 g./l., 4.0 g./l. and 0.8 g./l. are prepared. Twenty-five ml. of each of feed and extractant are then shaken for one min. in a 50 ml. graduated cylinder at room temperature. The results are set forth in Table 4:

TABLE 4

Selective Extraction with 5-DBT/DDNSA and with 5-DBT/DNNSA

| Example | Sulfonic Acid | $M_1$ | $M_2$ | $M_1$ % Extracted | $M_2$ Extracted | Separation Factor, S | pH |
|---|---|---|---|---|---|---|---|
| 26A | DDNSA | Ni | Co | 59.3 | 17.5 | 6.9 | 2.5 |
| 26B | DNNSA | Ni | Co | 65.3 | 19.5 | 7.8 | 2.5 |
| 27A | DDNSA | Cu | Fe | 27.5 | 2.1 | 17.9 | 1.5 |
| 27B | DNNSA | Cu | Fe | 31.5 | 2.1 | 21.7 | 1.5 |
| 27A* (strip) | DDNSA | Cu | Fe | 75.0 | 26 | — | — |
| 27B* (strip) | DNNSA | Cu | Fe | 67.0 | 12 | — | — |

*Stripped with 10% aqueous sulfuric acid following extraction procedure.

The results show that DNNSA and DDNSA are similar in their extraction and stripping behavior when used in combination with 5-DBT.

EXAMPLES 28-32

In order to demonstrate the effect of pH on extraction efficiency a series of aqueous solutions each containing 2 g./l. of copper (II), 2 g./l. of iron (II) and 0.4 g./l. of iron (II) is prepared at various pHs: 0.5, 1.0, 1.5, 2.0, and 2.36. One volume of each of these feed solutions is mixed with an equal volume of extractant containing 0.17 molar 5-DBT and 0.084 molar DDNSA (mole ratio 2.03:1) in Norpar-12 solvent for one minute at room temperature in a graduated cylinder and is then allowed to separate. After separation, the organic phase is analyzed to determine the degree of extraction. The results are set forth in Table 5:

TABLE 5

Selective Extractions at Varying pH's

| Example | Feed pH | % Cu Extractant | % Fe Extractant | S Cu/Fe |
|---|---|---|---|---|
| 28 | 0.5 | 24.2 | 0.47 | 67.6 |
| 29 | 1.0 | 65.8 | 0.54 | 354 |
| 30 | 1.5 | 82.5 | 0.88 | 531 |
| 31 | 2.0 | 90.3 | 1.42 | 646 |
| 32 | 2.36 | 95.0 | 1.24 | 1513 |

The results show that the combination of 5-DBT and DDNSA extracts copper in the presence of iron very efficiently from pH 1 to pH 2.36. The improvement of separation factor as the pH goes up suggests that the selectivity and efficiency will continue to improve as the pH increases further.

EXAMPLES 33-37

To demonstrate stripping and selective stripping of 5-DBT/DDNSA extracts containing copper and iron, the extract from Example 31 in Table 5 is stripped with varying concentrations of dilute $H_2SO_4$. Thus, the organic extract contains 1.81 g./l. copper (II) and 0.034 g./l. of iron (III) in a 0.17 molar 5-DBT/0.084 molar DDNSA solution in Norpar-12. The stripping electrolyte contains 0.5, 1.0, 5.0, 10.0 and 20.0 percent aqueous $H_2SO_4$. Equal volumes of extract and sulfuric acid are contacted for one minute at room temperature using a graduated cylinder as before. Analysis is performed on the organic phase. The results are set forth in Table 6:

TABLE 6

Stripping of Copper/Iron Extract with Dilute Sulfuric Acid Solutions

| Example | Wt. % H$_2$SO$_4$ | % Cu Stripped | % Fe Stripped |
|---|---|---|---|
| 33 | 0.5 | 4.4 | 70.4 |
| 34 | 1.0 | 5.8 | 83.8 |
| 35 | 5.0 | 52.2 | 77.1 |
| 36 | 10.0 | 67.5 | 90.7 |
| 37 | 20.0 | 79.2 | 83.5 |

It is seen that 5-DBT/DDNSA extracts containing copper and iron can be stripped readily using dilute sulfuric acid solutions. Further, the selectivity can readily be enhanced by scrubbing the extracts first with very low concentrations of sulfuric acid. This tends to remove the iron from the extractant very selectively, leaving the copper behind.

EXAMPLES 38–43

While it was found generally that effective extraction and stripping with DBT/DDNSA can be achieved with one minute mixing times, this is not true of nickel/cobalt stripping. In view of the excellent nickel selectivity observed in extraction, examples are performed to show that nickel/cobalt stripping can be enhanced by (1) adding other reagents to the extractant and (2) raising the extraction/stripping temperature from room temperature to 50° C.

A series of three extractants is prepared. The first is identical to Extractant E in Example 6, containing 0.171 molar 5-DBT and 0.084 molar DDNSA in Norpar-12. The second and third extractants have the same concentrations of 5-DBT and DDNSA as the first, but the second is 0.161 molar in 1-nonylbenzotriazole (1-NBT) and the third is 0.161 molar in 2-nonylbenzotriazole (2-NBT).

The feed solution employed in these examples contains 2.0 g./l. each of Ni(+2) and Co(+2) and has a pH of 2.5. All counter-ions are sulfate.

Nickel/cobalt extracts are prepared by shaking equal volumes of extractant and feed for one minute in a graduated cylinder. Analysis of the organic phase show the results given in Table 7:

TABLE 7

Extraction of Nickel and Cobalt with NBT/5-DBT/DDNSA Mixtures

| Example | Extractant | Temperature °C. | % Extracted Ni | % Extracted Co | Concentration g./l. Extract Ni | Concentration g./l. Extract Co | Separation Factor |
|---|---|---|---|---|---|---|---|
| 38 | 5-DBT/DDNSA | 20 | 71.8 | 18.1 | 1.44 | 0.36 | 11.5 |
| 39 | 5-DBT/DDNSA | 50 | 89.0 | 19.9 | 1.78 | 0.40 | 32.6 |
| 40 | 1-NBT/5-DBT/DDNSA | 20 | 79.3 | 14.6 | 1.59 | 0.29 | 22.4 |
| 41 | 1-NBT/5-DBT/DDNSA | 50 | 89.0 | 15.5 | 1.78 | 0.31 | 44.1 |
| 42 | 2-NBT/5-DBT/DDNSA | 20 | 71.3 | 18.1 | 1.43 | 0.36 | 11.2 |
| 43 | 2-NBT-5-DBT/DDNSA | 50 | 84.5 | 18.4 | 1.69 | 0.37 | 24.2 |

The organic extracts are stripped at their extraction temperatures by mixing with equal volumes of 20% sulfuric acid for times ranging from one minute to 45 minutes. The results are in Table 8:

TABLE 8

The Effect of 1-NBT and 2-NBT on the Stripping of Nickel and Cobalt

| Example | Extractant | Temperature °C. | Contact Time, Minutes | % Stripped Ni | % Stripped Co |
|---|---|---|---|---|---|
| 38A | 5-DBT/DDNSA | 20 | 1 | 6.4 | 18.5 |
| 38B | 5-DBT/DDNSA | 20 | 5 | 14.4 | 40.0 |
| 38C | 5-DBT/DDNSA | 20 | 10 | 22.3 | 42.5 |
| 38D | 5-DBT/DDNSA | 20 | 15 | 58.9 | 57.4 |
| 38E | 5-DBT/DDNSA | 20 | 45 | 62.7 | 64.6 |
| 39A | 5-DBT/DDNSA | 50 | 1 | 12.8 | 16.6 |
| 39B | 5-DBT/DDNSA | 50 | 5 | 26.5 | 37.0 |
| 39C | 5-DBT/DDNSA | 50 | 10 | 36.5 | 44.8 |
| 39D | 5-DBT/DDNSA | 50 | 15 | 50.6 | 48.8 |
| 39E | 5-DBT/DDNSA | 50 | 45 | 58.1 | 54.6 |
| 40A | 1-NBT/5-DBT/DDNSA | 20 | 1 | 23.2 | 44.8 |
| 40B | 1-NBT/5-DBT/DDNSA | 20 | 5 | 35.0 | 59.8 |
| 40C | 1-NBT/5-DBT/DDNSA | 20 | 10 | 64.0 | 65.6 |
| 40D | 1-NBT/5-DBT/DDNSA | 20 | 15 | 77.9 | 65.6 |
| 40E | 1-NBT/5-DBT/DDNSA | 20 | 25 | 77.9 | 65.4 |
| 41A | 1-NBT/5-DBT/DDNSA | 50 | 1 | 26.4 | 31.3 |
| 41B | 1-NBT/5-DBT/DDNSA | 50 | 5 | 49.7 | 40.0 |
| 41C | 1-NBT/5-DBT/DDNSA | 50 | 10 | 65.2 | 61.0 |
| 41D | 1-NBT/5-DBT/DDNSA | 50 | 15 | 74.2 | 63.2 |
| 41E | 1-NBT/5-DBT/DDNSA | 50 | 45 | 77.5 | 64.8 |
| 42A | 2-NBT/5-DBT/DDNSA | 20 | 1 | 7.9 | 20.4 |
| 42B | 2-NBT/5-DBT/DDNSA | 20 | 5 | 20.0 | 37.0 |
| 42C | 2-NBT/5-DBT/DDNSA | 20 | 10 | 24.8 | 44.7 |
| 42D | 2-NBT/5-DBT/DDNSA | 20 | 15 | 45.3 | 57.7 |
| 42E | 2-NBT/5-DBT/DDNSA | 20 | 45 | 52.3 | 63.0 |
| 43A | 2-NBT/5-DBT/DDNSA | 50 | 1 | 13.8 | 18.8 |
| 43B | 2-NBT/5-DBT/DDNSA | 50 | 5 | 27.2 | 35.9 |
| 43C | 2-NBT/5-DBT/DDNSA | 50 | 10 | 38.5 | 47.3 |
| 43D | 2-NBT/5-DBT/DDNSA | 50 | 15 | 52.4 | 55.0 |
| 43E | 2-NBT/5-DBT/DDNSA | 50 | 45 | 63.0 | 58.0 |

The stripping data show that:
(i) both nickel and cobalt strip slowly when together, with nickel being the slower of the two;
(ii) increasing the temperature increases the rate of stripping significantly, as indicated by the short-time results, while the long-time (equilibrium) results are almost the same; and
(iii) 1-NBT has a very positive affect on the stripping kinetics and 2-NBT has very little affect.

The combined effects of added 1-NBT and increased temperature are very positive giving a 4-fold increase in nickel stripping at 1 minute and five minutes.

1-NBT and increased temperature also have a very beneficial effect on Ni/Co extraction, as Table 7 shows. The addition of 1-NBT at 20° C. nearly doubles the Ni/Co separation factor, from 11.5 to 22.4. Raising the extraction temperature to 50° C. doubles it again:
  No 1-NBT, 20° C.: 11.5 Separation Factor
  Added 1-NBT, 20° C.: 22.4 Separation Factor
  Added 1-NBT, 50° C.: 44.1 Separation Factor

EXAMPLES 44-47

The maximum loading of copper (II) in 5-DBT solutions is determined. A series of pH 3.0 aqueous copper feeds is prepared containing 2.0, 7.5, 15.0 and 30.0 g./l. Cu(II) as sulfate. Each of these is shaken with an equal volume of 5-DBT in Norpar-12, 100 g./l. activity, at 50° C. for one minute in a graduated cylinder. The results are given in Table 9:

TABLE 9
Maximum Loading of Copper in 100 g./l. 5-DBT Solutions at 50° C.

| Example | Cu Concentration in Feed, g./l. | Cu Concentration in Feed, g./l.* | Organic Phase Appearance |
|---|---|---|---|
| 44 | 2 | 1.91 | Clear |
| 45 | 7.5 | 4.3 | Dark Precipitate |
| 46 | 15.0 | 6.2 | Dark Precipitate |
| 47 | 30.0 | 7.2 | Dark Precipitate |

*2 g./l. results of analysis of organic phase; all others by analysis of aqueous phase.

5-DBT by itself in Norpar-12 forms copper complexes with low solubility, since all of the feeds with more than 2 g./l. copper give precipitates. Substitution of a highly aromatic solvent, Aromatic-150 (Exxon), and extraction of the 15 g./l. feed using the same conditions as before also give a precipitate (although the precipitate forms overnight rather than immediately, as with Norpar-12).

EXAMPLES 46-49

When extractions are performed with added DDNSA, there is no signs of complex insolubility. Thus extractants are prepared containing 100 g./l. 5-DBT and 25 or 50 g./l. DDNSA in Norpar-12. Extractions are performed as before with the same 15 g./l. copper feed solution. The results are set forth in Table 10.

TABLE 10
Extraction of 15 g./l. Copper Solutions With 100 g./l. 5-DBT and Added DDNSA in Norpar-12

| Example | DDNSA Concentration g./l. | Cu Concentration in Extract, g./l. | Appearance of Organic Phase | Appearance After One Week, 20° C. |
|---|---|---|---|---|
| 46 | 0 | 6.2 | Precipitate | Precipitate |
| 48 | 25 | 5.4 | Clear | Clear |
| 49 | 50 | 6.8 | Clear | Clear |

It is seen that the addition of DDNSA to 5-DBT extractant solutions greatly increases the solubility of the copper complex in the extractant solution. An effect of this magnitude is enough to increase the value of the extractant considerably.

EXAMPLES 50-52

A non-sulfonic acid, di-(2-ethylhexyl) phosphoric acid (DEHPA) is substituted and selective extraction procedures are again carried out.

First, a determination is made of the maximum copper loading of 5-DBT/DEHPA solutions. The same technique is used as in Examples 44-47 mixing equal volumes of several feed solutions with each extractant solution for one minute, allowing the phases to separate, and then analyzing the organic phase. All extractions are done at room temperature (20° C.). The results are given in Table 11:

TABLE 11
Maximum Loading of Copper in 5-DBT DEHPA Extractants

| Example | 5-DBT g./l. | 5-DBT mol./l. | DEHPA g./l. | DEHPA mol./l. | Feed pH | Cu Maximum Loading g./l. | Organic Appearance |
|---|---|---|---|---|---|---|---|
| 50* | 0 | 0 | 222 | 0.69 | 3.76 | 1.4 | Clear |
| 51 | 50 | 0.175 | 12.5 | 0.039 | 3.0 | 5.74 | Clear |
| 52 | 50 | 0.175 | 25 | 0.078 | 3.0 | 6.60 | Clear |

*control

The figures in Table 11 show two significant things:
(i) combinations of 5-DBT and DEHPA extract copper at pH 3.0 much more effectively than DEHPA alone; and
(ii) the organic extracts are clear and free of precipitates.

EXAMPLES 53-57

Further procedures are carried out with mixtures of 5-DBT and DEHPA. Table 12 summarizes results following the extraction of Cu/Fe and Ni/Co mixtures at 20° C. using equal volumes of organic and aqueous phases and one minute mixing times. Results obtained with 5-DBT alone are reported again for comparison. All extractants use Norpar-12 solvent:

TABLE 12
Extraction of Metal Pairs With 5-DBT/DEHPA Mixtures.

| Example | 5-DBT g./l. | 5-DBT mol. /l. | DEHPA g./l. | DEHPA mol. /l. | Feed pH | % Extracted $M_1$ | % Extracted $M_2$ | Separation Factor, $DM_1/DM_2$ |
|---|---|---|---|---|---|---|---|---|
| A. Copper ($M_1$) and Iron (+3), ($M_2$), each 2.0 g./l., + 0.4 g./l. Fe (+2) ||||||||||
| 3 | 93.5 | 0.326 | 0 | 0 | 2.0 | 29.3 | 5.2 | 7.5 |
| 53 | 50 | 0.174 | 12.5 | 0.039 | 2.0 | 83.5 | 33.3 | 10.2 |
| 54 | 50 | 0.174 | 25.0 | 0.078 | 2.0 | 86.0 | 63.3 | 3.6 |
| B. Nickel ($M_1$) and Cobalt ($M_2$), each 2 g./l. ||||||||||
| 55 | 93.5 | 0.326 | 0 | 0 | 1.5 | 1.0 | 0.75 | 1.34 |
| 56 | 67.4 | 0.235 | 14.8 | 0.046 | 1.5 | 13.8 | 1.25 | 12.6 |
| 57 | 67.4 | 0.235 | 14.8 | 0.046 | 2.5 | 39.0 | 12.3 | 4.6 |

These results show that mixtures of 5-DBT and DDNSA are strong and selective extractants. The trend shown in Examples 53 and 54 suggest that higher ratios of 5-DBT to DEHPA will be even more selective for copper versus iron while maintaining high overall extraction.

EXAMPLES 58-61

Another non-sulfonic acid, a 253 MW naphthenic acid, is substituted and selective extraction procedures are again carried out. Both extraction and stripping are performed at 25° C. using equal volumes of aqueous and organic and one minute mixing times. Stripping is performed with 18% sulfuric acid. The results are given in Table 13:

TABLE 13
Selective Extraction and Stripping With 5-DBT/Naphthenic Acid Mixtures. Feed: 2 g./l. Cu(+2), 2 g./l. Fe (+3), 0.4 g./l. Fe (+2).

| Example | Feed pH | 5-DBT mol.l liter | Naphthenic Acid mol./liter | % Extracted Cu | % Extracted Fe | Separation Factor Cu/Fe | % Stripped Cu | % Stripped Fe |
|---|---|---|---|---|---|---|---|---|
| 58 | 1.5 | .174 | .039 | 18.8 | 3.3 | 6.8 | 60.7 | 7.7 |
| 59 | 1.5 | .174 | .077 | 15.5 | 3.8 | 4.6 | 60.6 | 6.7 |

TABLE 13-continued

Selective Extraction and Stripping With 5-DBT/
Naphthenic Acid Mixtures. Feed: 2 g./l. Cu(+2),
2 g./l. Fe (+3), 0.4 g./l. Fe (+2).

| Example | Feed pH | 5-DBT mol.l liter | Naph- thenic Acid mol./liter | % Extracted Cu | % Extracted Fe | Separation Factor Cu/Fe | % Stripped Cu | % Stripped Fe |
|---|---|---|---|---|---|---|---|---|
| 60 | 2.0 | .174 | .039 | 53.3 | 1.5 | 74.9 | 67.6 | 35.0 |
| 61 | 2.0 | .174 | .077 | 53.0 | 1.0 | 111.6 | 67.7 | 42.5 |

These results show that 5-DBT/Naphthenic Acid mixtures are very selective extractants for copper in the presence of iron. The results further suggest that copper/iron extraction efficiency and selectivity will improve at a pH above 2.

From the foregoing it is seen that 5-alkylbenzotriazoles are extremely useful in their own right and in combination with acids in the selective extraction of a variety of metals.

Obviously, many variations of the invention will suggest themselves in view of the detailed description. All such obvious variations are within the full intended scope of the appended claims.

We claim:

1. A process for recovering a first cationic metal value selected from the group consisting of copper (II), nickel (II), iron (III) and cobalt (II) from an aqueous solution comprising a pair of said first cationic metal value and a second cationic metal value, said process comprising contacting said aqueous solution at an acidic pH with a solvent-extractant comprising
   (i) a 5-alkylbenzotriazole, the alkyl groups of which contain from 4 to 18 carbon atoms; and
   (ii) a water-immiscible solvent for (i) and metal complexes thereof to provide a solution of said metal value in said solvent-extractant;
separating the solution thus formed from the aqueous raffinate depleted in said first metal value; and recovering said first metal value from said separated solution.

2. A process as defined in claim 1 wherein said metal value pair is selected from the group consisting of copper (II) and cobalt (II), copper (II) and nickel (II), copper (II) and iron (III), copper (II) and zinc (II) and cobalt (II) and zinc (II).

3. A process as defined in claim 1 wherein said solvent-extractant also includes (iii)(a) an alkyl aromatic sulfonic acid; (b) a dialkyl phosphoric acid; (c) a carboxylic acid, or a mixture of any of the foregoing, the mole % of 5-alkylbenzotriazole (i) in the combined (i) and (iii) being in the range of 10 to 95.

4. A process as defined in claim 3 wherein said metal value pair is selected from the group consisting of copper (II) and cobalt (II), copper (II) and nickel (II), copper (II) and iron (III), copper (II) and zinc (II), nickel (II) and cobalt (II), nickel (II) and zinc (II), nickel (II) and iron (III), iron (III) and magnesium (II) and cobalt (II) and zinc (II).

5. A process as defined in claim 3 wherein said solvent-extractant also includes a 1-alkylbenzotriazole, the alkyl groups of which contain from 4 to 18 carbon atoms.

6. A process as defined in claim 5 wherein said first metal value is recovered from said separated solution by stripping with acid.

7. A process as defined in claim 6 wherein the stripping with acid is carried out at an elevated temperature of from about 30° to about 70° C.

8. A process as defined in claim 3 wherein said alkyl aromatic sulfonic acid (iii)(a) is a polyalkyl aromatic sulfonic acid having a molecular weight of at least about 400.

9. A process as defined in claim 8 wherein said sulfonic acid is dinonylnaphthalene sulfonic acid.

10. A process as defined in claim 8 wherein said sulfonic acid is didodecylnaphthalene sulfonic acid.

11. A process as defined in claim 3 wherein said dialkyl phosphoric acid (iii)(b) is di-(2-ethylhexyl) phosphoric acid.

12. A process as defined in claim 3 wherein said carboxylic acid (iii)(c) has a molecular weight in the range of 125–300.

13. A process as defined in claim 1 wherein said first metal value is recovered from said separated solution by stripping with acid.

14. A process as defined in claim 13 wherein the stripping with acid is carried out at an elevated temperature of from about 30° to about 70° C.

15. A process as defined in claim 1 wherein said 5-alkylbenzotriazole (i) is 5-dodecylbenzotriazole.

16. A process for recovering a first cationic metal value from an aqueous solution comprising a pair of said first cationic metal value and a second cationic metal value, said pair being selected from the group consisting of copper (II) and cobalt (II), copper (II) and nickel (II), copper (II) and iron (III), copper (II) and zinc (II) and cobalt (II) and zinc (II), said process comprising contacting said aqueous solution at a pH of below 6.0 with a solvent-extractant comprising
   (i) a 5-alkyl-1H-benzotriazole, the alkyl groups of which contain from 4 to 18 carbon atoms; and
   (ii) a water-immiscible solvent for (i) and metal complexes thereof to provide a solution of said metal value in said solvent-extractant; separating the solution thus formed from the aqueous raffinate depleted in said first metal value; and recovering said first metal value from said separated solution.

* * * * *